Dec. 28, 1965 C. P. TALLEY 3,226,248
METHOD OF PRODUCING REFRACTORY MONOCRYSTALLINE BORON STRUCTURES
Filed March 14, 1962 2 Sheets-Sheet 1
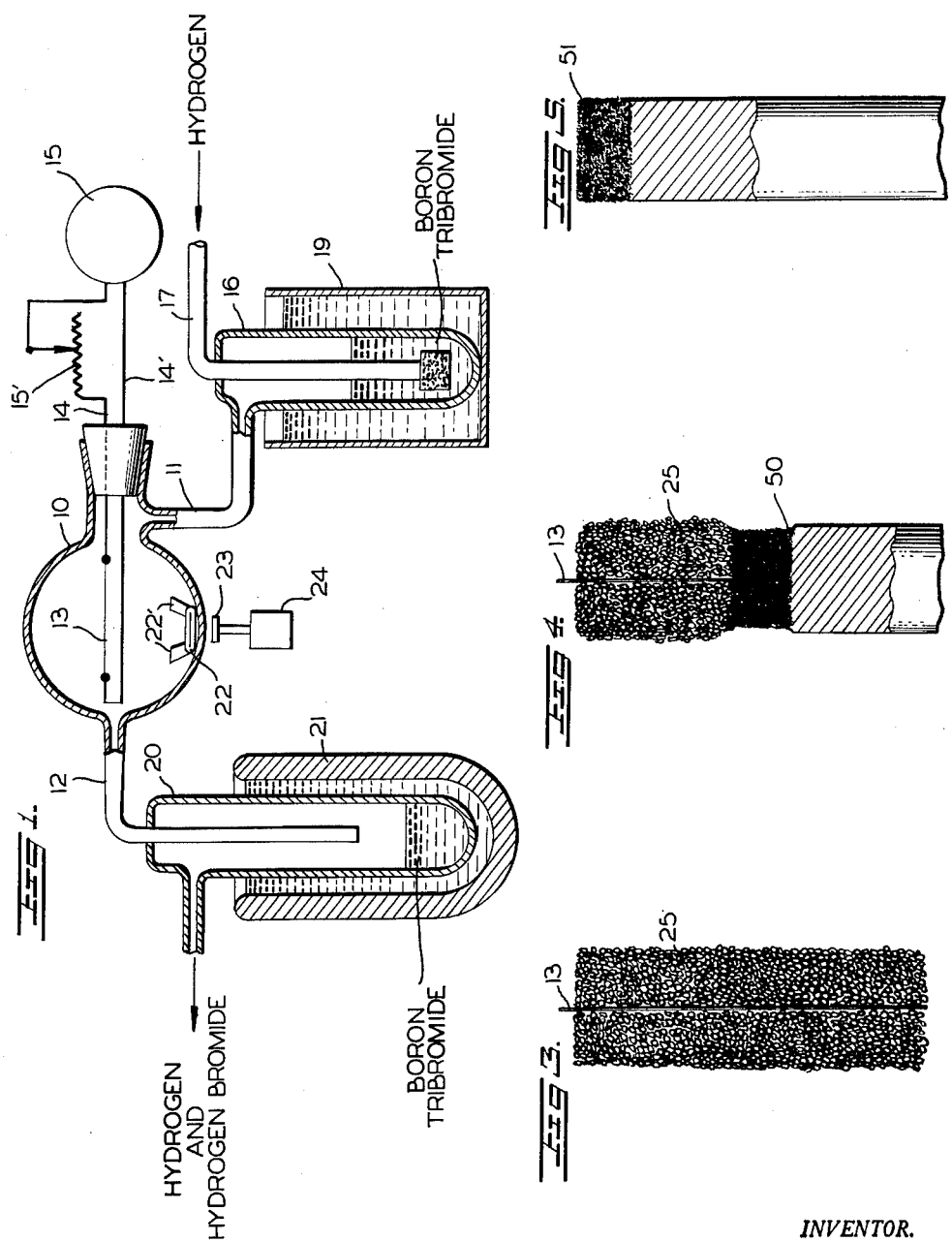
INVENTOR.
CLAUDE P. TALLEY
BY Stowell & Stowell
ATTORNEYS

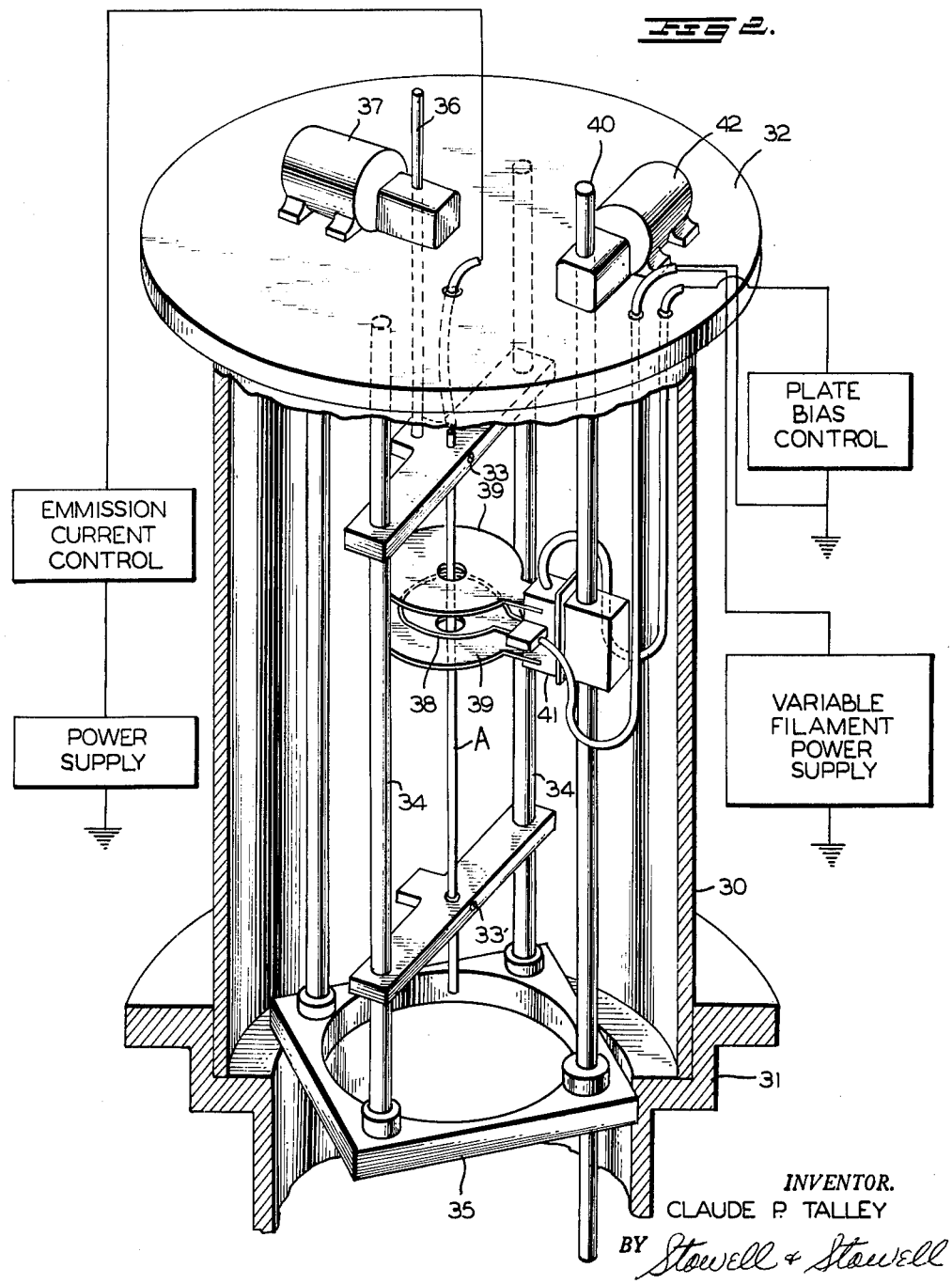

A United States Patent Office 3,226,248
Patented Dec. 28, 1965

3,226,248
METHOD OF PRODUCING REFRACTORY MONO-CRYSTALLINE BORON STRUCTURES
Claude P. Talley, Chesterfield County, Va., assignor to Texaco Experiment Incorporated, Richmond, Va., a corporation of Virginia
Filed Mar. 14, 1962, Ser. No. 179,570
5 Claims. (Cl. 117—93.3)

This application is a continuation-in-part of my application Serial No. 862,547, filed on December 29, 1959, now abandoned.

This invention relates to a method of producing refractory bodies of high purity and particularly to the production of high purity single crystal refractory structures.

A principal object of the invention is the production of boron structures which have a very low content of impurities and particularly the production of such structures in which the boron is substantially monocrystalline.

Typically, the method of the invention comprises passing a mixture of a boron halide and hydrogen in contact with a heated elongated filamentary substrate maintained at a temperature in the range from about 1100° K. to somewhat above 1600° K. but below the melting points of baron and the substrate to obtain a massive deposit of amorphous or polycrystalline boron on the substrate, continuing such deposition of boron until a rod consisting of a preponderant amount of boron on the filamentary substrate is formed, subjecting the rod thus obtained to localized heating to a temperature above the melting point of the boron to form a local zone of molten boron extending transversely across the rod and advancing the localized zone of molten boron longitudinally along the rod to segregate the material of the filamentary substrate in an end portion of the rod.

The boron rod may be prepared by passing a mixture of hydrogen and boron halide, such as boron tribromide, over a metallic filament heated, for example by internal electrical resistance, to a preselected temperature. The mixture of hydrogen and boron tribromide can be conveniently made by passing a stream of hydrogen gas through a chamber containing liquid boron bromide maintained at a temperature effective to produce the desired concentration of boron bromide in the hydrogen leaving the chamber. The mixture thus obtained is passed through a deposition chamber containing the heated surface at a rate effective to maintain the highest possible rate of deposition of boron consistent with maintaining substantial uniformity of conditions in the zone of deposition. Improvement in uniformity of conditions in the deposition chamber and in rate of deposition of boron, particularly at high rates of deposition, can be obtained by subjecting the gaseous mixture in the chamber to agitation, for example, by means of an externally actuated magnetic stirrer.

Among the substrates which can advantageously be used for the preparation of boron rods are tungsten, rhenium, tantalum, titanium, molybdenum and graphite. Tungsten filaments containing 1 to 2% of thorium oxide are particularly useful in preventing filament breakage during deposition.

The most effective method of locally heating the boron rods thus produced to eliminate impurities from the major portion of the rod and to produce monocrystal structures by is electron bombardment of the rod in a high vacuum. Some types of contaminants are volatilized in this method but most of the impurities are concentrated in an end portion of the rod. It is desirable to reduce the ratio of substrate material to boron in the rod to as low a figure as possible and this may be effected by using very fine filamentary substrates and building up boron deposits of substantial diameter thereon. Thus, for example, a boron rod 5.7 mm. in diameter deposited on a 6-micron tungsten filament will contain only about 9 parts per million of tungsten.

X-ray diffraction data indicate that in the deposition operation the boron combines with the substrate substance to form borides. In the case of tungsten substrates, the compounds $WB_2$ or $W_2B_5$ may be formed. In the zone melting operation the substance of the substrate is in general segregated in the form of the corresponding compound with boron if the boron has been deposited on the rod in preponderating amount. However, if the amount of boron deposited is in approximately stoichiometric proportion with respect to a desired compound of boron with the substrate material, such compound then is the preponderant component of the rod and excess of boron, of substrate substance or of other compounds of them than the preponderant component become the "impurities" which are segregated in the zone melting operation. In this way, the method of the invention may be utilized for the preparation of bodies of boron compounds in high purity.

The method of the invention may also be used for the production of other refractory compositions by subjecting elongated composite structures, wherein one component of the desired composition is concentrically stratified upon another component or wherein two or more components are codeposited on a substrate, to progressive local melting from one end of the elongated structure to the other whereby the composition of the structure is rendered uniform both longitudinally and transversely.

The invention will be more particularly described with reference to the accompanying drawings in which:

FIG. 1 is a diagrammatic representation of apparatus suitable for the preparation of boron rods by deposition on a filamentary substrate;

FIG. 2 is a diagrammatic representation in partial section of apparatus suitable for the purification of boron rods and their conversion to single crystals;

FIG. 3 is a diagrammatic representation in longitudinal section of a polycrystalline boron rod deposited on a filamentary substrate;

FIG. 4 is a diagrammatic representation in longitudinal section of the boron rod of FIG. 3 which has been partially purified and converted to monocrystalline form; and FIG. 5 is a diagrammatic representation in longitudinal section of a boron rod in which impurities including the substrate material have been concentrated in an end portion of the rod, the remaining portion of the rod being a single crystal.

In FIG. 1, 10 is a reaction chamber having an inlet 11 and outlet 12. Filament 13 is supported in the chamber and supplied with heating current by conductors 14, 14' connected to voltage regulator 15 through resistor 15'. 16 is a container for boron tribromide having an inlet 17 provided with a porous Pyrex glass plug and an outlet connected through 11 to reaction chamber 10. Container 16 is provided with a temperature regulating bath 19. 20 is a condenser connected to the outlet 12 of the reaction chamber and provided with a cooling bath 21 to condense unreacted boron tribromide.

Agitation of the contents of reaction chamber 10 can be effectively obtained with a magnetic stirrer comprising a bar magnet 22 covered with Pyrex glass and provided with vanes 22' of molybdenum sheet. The stirrer is actuated by rotation of external bar magnet 23 by means of motor 24.

Hydrogen gas is supplied to saturator 16 at a regulated rate of flow and carries into the reaction chamber an amount of boron tribromide determined by the temperature maintained in the saturator. In a typical operation, 500 cm.³/min. of hydrogen at 1 atmosphere and 25° C. which has been previously purified of oxygen and water, is passed through liquid $BBr_3$ in saturator 16 at a temperature of 25° C. giving a mixture of 8 to 10 mole-percent of $BBr_3$ in the hydrogen passing out of saturator 16. A tungsten filament 13, 10 cm. in length and 25 microns in diameter, is maintained at 1500° K. by electric resistance heating. The rate of deposition of boron under these conditions is about 10 mg. of boron per cm.² per minute. A boron rod having a diameter of 4 mm. is produced in about 100 minutes.

Outgassing of the filament in hydrogen at about 1700° K. for 5 to 10 minutes before the deposition of boron is helpful in reducing filament breakage. In order to reduce the possibility of filament breakage at the point of connection to the electrodes 14, 14′, it is desirable to make this region hot enough to cause boron to deposit and strengthen the connection zone as the rod diameter increases. This may be accomplished by tapering the electrodes towards the junction so that there is no abrupt change in diameter between the filament and the electrodes, or by using an electrode material of sufficiently greater electrical resistivity than the filament material that the electrodes, even though larger in diameter than the filament, are hot enough to cause boron to deposit at the junction of the filament and electrode as well as on the filament itself.

The flow rate of the hydrogen and the concentration of boron tribromide in the gas are not particularly critical but the rate of deposition is, in general, higher with larger mass flow rates of reactants and higher concentration of boron halide.

The provision of a variable resistor 15′ external to the reaction chamber in series with the filament is beneficial in aiding in the control of the temperature of the boron deposit during deposition. The resistance of the external resistor should be of the same order of magnitude as that of the boron deposit.

A typical deposited boron rod is shown in FIG. 3, wherein 13 is the filamentary substrate and 25 represents the body of polycrystalline boron.

The apparatus for moving zone melting of the boron rods as shown in FIG. 2, comprises a Pyrex glass cylinder 30, tightly mounted in an annular base plate 31, which is adapted to be connected to the inlet opening of a high vacuum system, not shown, preferably capable of maintaining pressures of the order of $10^{-6}$ mm. Hg. Although the zone melting operation can be effectively carried out at pressures as high as $10^{-4}$ mm. Hg, operation in the range of $10^{-6}$ to $10^{-7}$ mm. Hg is preferred. A cover plate 32 is tightly mounted on the upper end of cylinder 30.

The boron rod A to be treated is carried between cross-members 33, 33′ vertically slidable on quartz rods 34 mounted in cover plate 32 and spider 35. The cross-member boron rod assembly can be vertically adjusted in operation by means of quartz rod 36 actuated by motor 37.

A vertically movable electron gun assembly consisting of a 20-mil tungsten wire loop 38 and nickel beam deflection plates 39 is concentrically positioned about the boron rod and carried by a boron nitride fitting 41 mounted on stainless steel rod 40, which is vertically movable by means of motor 42. In a typical embodiment the loop 38 of the electron gun assembly is about 40 mm. in diameter and the deflection plates 39 are about 50 mm. in outside diameter and about 10 mm. in inside diameter and are spaced about 10 mm. from the wire loop.

Rods 36 and 40 are vacuum sealed at their point of passage through cover plate 32, for example, with Viton O-rings, and the electrical connections to the gun assembly are similarly sealed.

In operation, after the chamber has been evacuated to about $10^{-6}$ mm. of Hg, the filament 38 is heated to about 2300° K. by the filament power supply and a positive potential of about 7 kv. is applied to the boron rod. The deflection plates 39 are maintained at about 200 volts negative potential with respect to the filament to focus the bombarding electrons from the filament into a thin sheet. The melting zone is then advanced along the boron rod from one end to the other at a rate of about 1 millimeter per minute.

As illustrated in the diagrammatic FIG. 4, the substrate material and other impurities segregate in the molten pool 50 adjacent the unmelted portion of the rod, while the resolidified portion of the rod is not only highly purified but is monocrystalline, typically in the β-rhombohedral form. A plurality of passes of the fusion zone along the rod may be made, if required to attain the desired degree of purity. The final state of the rods with impurities concentrated in an end zone 51 and the remainder of the rod in a high purity monocrystalline form is illustrated in FIG. 5.

I claim:

1. The method of producing monocrystalline boron structures which comprises passing a mixture of a boron halide and hydrogen in contact with a heated elongated filamentary substrate other than boron maintained at a temperature in the range from about 1100° K. to somewhat above 1600° K. but below the melting points of boron and the substrate to obtain a massive deposit of boron on the substrate, continuing such deposition of boron until a rod consisting of a preponderant amount of boron on the filamentary substrate is formed, subjecting the rod thus obtained to localized heating to a temperature above the melting point of the boron to form a local zone of molten boron extending transversely across the rod and advancing the localized zone of molten boron longitudinally along the rod to segregate the material of the filamentary substrate in an end portion of the rod.

2. The method as defined in claim 1 wherein the filamentary substrate is a tungsten wire.

3. The method of producing monocrystalline boron structures which comprises passing a mixture of a boron halide and hydrogen in contact with a heated elongated filamentary substrate other than boron maintained at a temperature in the range from about 1100° K. to somewhat above 1600° K. but below the melting points of boron and the substrate to obtain a massive deposit of boron on the substrate, continuing such deposition of boron until a rod consisting of a preponderant amount of boron on the filamentary substrate is formed, subjecting the rod thus obtained to localized heating by electron bombardment to a temperature above the melting point of the boron to form a local zone of molten boron extending transversely across the rod and advancing the localized zone of molten boron longitudinally along the rod to segregate the material of the filamentary substrate in an end portion of the rod.

4. The method of producing monocrystalline boron structures which comprises passing a mixture of a boron halide and hydrogen in contact with a heated elongated filamentary substrate other than boron maintained at a temperature in the range from about 1100° K. to somewhat above 1600° K. but below the melting points of boron and the substrate to obtain a massive deposit of boron on the substrate, continuing such deposition of boron until a rod consisting of a preponderant amount of boron on the filamentary substrate is formed, subjecting the rod thus obtained to localized heating by electron bombardment under a pressure not greater than $10^{-4}$ millimeters of mercury to a temperature above the melting point of the boron to form a local zone of molten boron extending transversely across the rod and advancing the localized zone of molten boron longitudinally along the rod to segregate the material of the filamentary substrate in an end portion of the rod.

5. The method of producing monocrystalline boron structures which comprises passing a mixture of a boron halide and hydrogen in contact with a heated elongated filamentary substrate other than boron maintained at a temperature in the range from about 1100° K. to somewhat above 1600° K. but below the melting points of boron and the substrate to obtain a massive deposit of boron on the substrate, continuing such deposition of boron until a rod consisting of at least about 100,000 parts by weight of boron to each part by weight of the filamentary substrate is formed, subjecting the rod thus obtained to localized heating to a temperature above the melting point of the boron to form a local zone of molten boron extending transversely across the rod and advancing the localized zone of molten boron longitudinally along the rod to segregate the material of the filamentary substrate in an end portion of the rod.

References Cited by the Examiner

UNITED STATES PATENTS

| | | | |
|---|---|---|---|
| 1,774,410 | 8/1930 | Van Arkel | 23—209 |
| 2,823,151 | 2/1958 | Yntema et al. | 117—135.1 |
| 2,839,367 | 6/1958 | Stern et al. | 23—209 |
| 2,858,199 | 10/1958 | Larson | 23—301 |
| 2,990,261 | 6/1961 | Greiner | 23—301 |
| 3,030,189 | 4/1962 | Schweickert et al. | 23—301 |
| 3,030,194 | 4/1962 | Emeis | 23—301 |

OTHER REFERENCES

Powell et al.: "Vapor Plating," 1955, John Wiley and Sons, Inc., New York, pp. 103–111 (pp. 106 and 107 relied on).

RICHARD D. NEVIUS, *Primary Examiner.*

REUBEN EPSTEIN, *Examiner.*